(12) United States Patent
Sanson et al.

(10) Patent No.: US 12,552,407 B2
(45) Date of Patent: Feb. 17, 2026

(54) CODE-TIME BLOCK MIMO MODULATION FOR DIGITAL MODULAR RADAR

(71) Applicant: GM Cruise Holdings LLC, San Francisco, CA (US)

(72) Inventors: Jessica Bartholdy Sanson, Munich (DE); Jorge Julio Jácome Muñoz, Munich (DE); Kalin Hristov Kabakchiev, Munich (DE); Gustavo Adolfo Guarín Aristizabal, Munich (DE); Andre Giere, Oberpframmern (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 114 days.

(21) Appl. No.: 18/305,059

(22) Filed: Apr. 21, 2023

(65) Prior Publication Data
US 2024/0351607 A1    Oct. 24, 2024

(30) Foreign Application Priority Data

Apr. 18, 2023   (EP) ...................... 23168568

(51) Int. Cl.
*B60W 60/00*   (2020.01)
*G01S 13/00*   (2006.01)

(52) U.S. Cl.
CPC ........... *B60W 60/001* (2020.02); *G01S 13/00* (2013.01); *B60W 2420/408* (2024.01)

(58) Field of Classification Search
CPC ..................... B60W 60/001; B60W 2420/408; G01S 13/00
USPC ........................................................ 342/159
See application file for complete search history.

(56) References Cited

U.S. PATENT DOCUMENTS

| | | | | |
|---|---|---|---|---|
| 6,809,681 | B1* | 10/2004 | Niechayev | G01S 13/582 342/159 |
| 2009/0141775 | A1* | 6/2009 | Kober | H04B 1/1027 342/194 |
| 2016/0223644 | A1* | 8/2016 | Soga | G01S 7/0234 |
| 2019/0302224 | A1* | 10/2019 | Bordes | G01S 7/0232 |
| 2021/0389416 | A1* | 12/2021 | Hong | G01S 7/0235 |
| 2022/0334216 | A1* | 10/2022 | Maor | G01S 13/931 |

OTHER PUBLICATIONS

European Search Report for European Application No. 23168568.6 dated Jul. 25, 2023, 8 pages.
European Office Action for European Application No. 23168568.6; dated Sep. 4, 2025; 7 pages.

(Continued)

*Primary Examiner* — William Kelleher
*Assistant Examiner* — Samarina Makhdoom
(74) *Attorney, Agent, or Firm* — CANTOR COLBURN LLP

(57) ABSTRACT

A radar system comprises a plurality of transmit antennas that transmit a radar signal toward a target, wherein each transmit antenna transmits its signal using a different space-time block code in a given transmission time slot. In one embodiment, no two transmit antennas transmit using the same space-time block code in the same transmission time slot.

20 Claims, 13 Drawing Sheets

(56) References Cited

OTHER PUBLICATIONS

Hakobyan Gor et al: "High-Performance Automotive Radar: A review of signal processing algorithms and modulation schemes", IEEE Signal Processing Magazine, IEEE, USA, vol. 36, No. 5, Sep. 1, 2019 (Sep. 1, 2019), pp. 32-44,XP011745487.
Sadeque et al: "Waveform Transmission Scheme for MIMO Radar Imaging Based on Space-Time Block Codes", IEEE Transactions On Aerospace and Electronic Systems, IEEE Service Center, vol. 50, No. 1, Jan. 1, 2014, pp. 777-785, XP011547112.
Santra Avik et al: "Ambiguity function and imaging performance ofcoded FMCW waveforms with fast 4D receiver processing in MIMO radar", Digital Signal Processing, Academic Press, Orlando, FL, US, vol. 97, Nov. 25, 2019 (Nov. 25, 2019), XP085954581.
Vucetic Branka et al: "Space-Time Block Codes"In: "Space-Time Coding", Apr. 8, 2003 (Apr. 8, 2003), Wiley, XP093309472,ISBN: 978-0-470-01413-4 pp. 91-115, DOI: 10.1002/047001413X.ch3.

* cited by examiner $$C_{3,3/4} = \begin{matrix} \text{Tx1} & \text{Tx2} & \text{Tx3} \\ c_1 & c_2 & \frac{c_3}{\sqrt{2}} \\ -c_2^* & c_1^* & \frac{c_3}{\sqrt{2}} \\ \frac{c_3^*}{\sqrt{2}} & \frac{c_3^*}{\sqrt{2}} & \frac{(-c_1-c_1^*+c_2-c_2^*)}{2} \\ \frac{c_3^*}{\sqrt{2}} & -\frac{c_3^*}{\sqrt{2}} & \frac{(c_2+c_2^*+c_1-c_1^*)}{2} \end{matrix} \begin{matrix} \text{TS1} \\ \text{TS2} \\ \text{TS3} \\ \text{TS4} \end{matrix} \longleftarrow 602$$

$$C_{3,1/2} = \begin{matrix} \text{Tx1} & \text{Tx2} & \text{Tx3} \\ c_1 & c_2 & c_3 \\ c_2 & c_1 & -c_4 \\ c_3 & c_4 & c_1 \\ c_4 & -c_3 & c_2 \\ c_1^* & c_2^* & c_3^* \\ -c_2^* & c_1^* & -c_4^* \\ -c_3^* & c_4^* & c_1^* \\ -c_4^* & -c_3^* & c_2^* \end{matrix} \begin{matrix} \text{TS1} \\ \text{TS2} \\ \text{TS3} \\ \text{TS4} \\ \text{TS5} \\ \text{TS6} \\ \text{TS7} \\ \text{TS8} \end{matrix}$$

← 600

$$\begin{matrix} \text{Tx1} & \text{Tx2} & \text{Tx3} \\ s_1 & s_1^* & s_2^* \\ s_1 & -s_1 & s_2 \\ s_2 & s_2 & s_1 \\ -s_2 & s_2^* & s_1 \end{matrix} \begin{matrix} \text{TS1} \\ \text{TS2} \\ \text{TS3} \\ \text{TS4} \end{matrix}$$

$$c_{4,4,1/2} = \begin{bmatrix} & TS1 & TS2 & TS3 & TS4 & TS5 & TS6 & TS7 & TS8 \\ Tx1 & c_1 & -c_2^* & c_3^* & c_4 & c_4^* & c_3 & -c_2 & c_1^* \\ Tx2 & c_2 & c_1^* & c_4^* & -c_3 & -c_3^* & c_4 & c_1 & c_2^* \\ Tx3 & c_3 & -c_4 & -c_1^* & c_2^* & c_2 & -c_1 & c_4^* & c_3^* \\ Tx4 & c_4 & c_3 & -c_2 & -c_1 & c_1^* & c_2^* & -c_3^* & c_4^* \end{bmatrix}$$

$$c_{4,3,4} = \begin{bmatrix} & Tx1 & Tx2 & Tx3 & Tx4 \\ TS1 & c_1 & c_2 & \tfrac{c_3}{\sqrt{2}} & \tfrac{c_3}{\sqrt{2}} \\ TS2 & -c_2^* & c_1^* & \tfrac{c_3}{\sqrt{2}} & \tfrac{c_3}{\sqrt{2}} \\ TS3 & \tfrac{c_3^*}{\sqrt{2}} & \tfrac{c_3^*}{\sqrt{2}} & \tfrac{(-c_1-c_1^*+c_2-c_2^*)}{2} & \tfrac{(-c_2-c_2^*+c_1-c_1^*)}{2} \\ TS4 & \tfrac{c_3^*}{\sqrt{2}} & -\tfrac{c_3^*}{\sqrt{2}} & \tfrac{(c_2+c_2^*+c_1-c_1^*)}{2} & \tfrac{(-c_1-c_1^*-c_2+c_2^*)}{2} \end{bmatrix}$$

$$\begin{bmatrix} & Tx1 & Tx2 & Tx3 & Tx4 \\ TS1 & s_1^* & s_1^* & s_2^* & s_2^* \\ TS2 & s_1 & -s_1 & s_2 & -s_2 \\ TS3 & -s_2^* & -s_2^* & s_1^* & s_1^* \\ TS4 & -s_2 & s_2 & -s_1 & s_1 \end{bmatrix}$$

FIG. 7

$$
800 \rightarrow \begin{array}{c} \\ \text{TS1} \\ \text{TS2} \\ \text{TS3} \\ \text{TS4} \\ \text{TS5} \\ \text{TS6} \\ \text{TS7} \\ \text{TS8} \end{array} \begin{array}{cccccc} \text{Tx1} & \text{Tx2} & \text{Tx3} & \text{Tx4} & \text{Tx5} & \text{Tx6} \\ \left[\begin{array}{cccccc} s_1^* & s_1^* & s_2^* & s_2^* & s_3 & -s_3 \\ s_1 & -s_1 & s_2 & -s_2 & s_3^* & s_3^* \\ -s_2 & -s_2 & s_1 & s_1 & -s_4^* & -s_4^* \\ -s_2^* & s_2^* & s_1^* & -s_1^* & -s_4 & s_4 \\ -s_3 & s_3 & s_4 & s_4 & s_1^* & s_1^* \\ -s_3^* & -s_3^* & s_4^* & -s_4^* & s_1 & -s_1 \\ -s_4 & -s_4 & -s_3 & s_3 & s_2^* & s_2^* \\ -s_4^* & s_4^* & -s_3^* & -s_3^* & s_2 & -s_2 \end{array}\right] \end{array}
$$

FIG. 8

$$
900 \rightarrow \begin{array}{c} \\ \text{TS1} \\ \text{TS2} \\ \text{TS3} \\ \text{TS4} \\ \text{TS5} \\ \text{TS6} \\ \text{TS7} \\ \text{TS8} \end{array} \begin{array}{cccccccc} \text{Tx1} & \text{Tx2} & \text{Tx3} & \text{Tx4} & \text{Tx5} & \text{Tx6} & \text{Tx7} & \text{Tx8} \\ \left[\begin{array}{cccccccc} s_1^* & s_1^* & s_2^* & s_2^* & s_3 & -s_3 & s_4^* & s_4^* \\ s_1 & -s_1 & s_2 & -s_2 & s_3^* & s_3^* & s_4 & -s_4 \\ -s_2 & -s_2 & s_1 & s_1 & -s_4^* & -s_4^* & s_3 & -s_3 \\ -s_2^* & s_2^* & s_1^* & -s_1^* & -s_4 & s_4 & s_3^* & s_3^* \\ -s_3 & s_3 & s_4 & s_4 & s_1^* & s_1^* & -s_2 & -s_2 \\ -s_3^* & -s_3^* & s_4^* & -s_4^* & s_1 & -s_1 & -s_2^* & s_2^* \\ -s_4 & -s_4 & -s_3 & s_3 & s_2^* & s_2^* & s_1 & s_1 \\ -s_4^* & s_4^* & -s_3^* & -s_3^* & s_2 & -s_2 & s_1^* & -s_1^* \end{array}\right] \end{array}
$$

FIG. 9A

$$
902 \rightarrow \begin{array}{c} \\ \text{TS1} \\ \text{TS2} \\ \text{TS3} \\ \text{TS4} \\ \text{TS5} \\ \text{TS6} \\ \text{TS7} \\ \text{TS8} \end{array} \begin{array}{cccccccc} \text{Tx1} & \text{Tx2} & \text{Tx3} & \text{Tx4} & \text{Tx5} & \text{Tx6} & \text{Tx7} & \text{Tx8} \\ \left[\begin{array}{cccccccc} x_1 & x_2 & x_3 & x_4^* & x_5 & x_6 & x_7 & x_8^* \\ -x_2^* & x_1^* & -x_4 & x_3^* & -x_6^* & x_5^* & -x_8 & x_7^* \\ -x_3^* & x_4 & x_1^* & -x_2^* & -x_7^* & x_8 & x_5^* & -x_6^* \\ -x_4^* & -x_3 & x_2 & x_1 & -x_8 & x_7 & x_6 & x_5 \\ x_5 & x_6 & x_7 & x_8^* & x_1 & x_2 & x_3 & x_4^* \\ -x_6^* & x_5^* & -x_8 & x_7^* & -x_2^* & x_1^* & -x_4 & x_3^* \\ -x_7^* & x_8 & x_5^* & -x_6^* & -x_3^* & x_4 & x_1^* & -x_2^* \\ -x_8^* & -x_7 & x_6 & x_5 & -x_4^* & -x_3 & x_2 & x_1 \end{array}\right] \end{array}
$$

FIG. 9B

CODE-TIME BLOCK MIMO MODULATION FOR DIGITAL MODULAR RADAR

RELATED APPLICATION

This application claims priority to European Patent Application No. 23168568.6, filed on Apr. 18, 2023, and entitled "CODE-TIME BLOCK MIMO MODULATION FOR DIGITAL MODULAR RADAR". The entirety of this application is incorporated herein by reference.

BACKGROUND

Cross-correlation is an operation used in radar systems to detect and measure the similarity between two signals. In the context of radar, cross-correlation is typically used to compare a received signal with a known reference signal in order to detect the presence of a target or to measure its range and velocity.

In radar, the transmitted signal is reflected off a target, and the resulting radar return is received by the radar receiver. The received signal is then cross correlated with a reference signal to determine the time delay between the transmitted signal and the received echo. This time delay is used to calculate the range to the target. Cross-correlation can also be used to measure the Doppler shift in the received signal, which is caused by the relative motion between the target and the radar.

Cross-correlation noise is a type of interference that affects radar signals. When radar waves encounter physical objects, they scatter and reflect back to the receiver. This reflected energy can be detected by the radar, but it can also interfere with the detection of other objects, particularly if the reflected energy from one object overlaps with the energy from another object. Cross-correlation noise occurs when the radar signals reflect off of stationary objects such as buildings trees, or the ground, and returns to the receiver with the delay that is similar to the delay of the signal from a moving target. This can make it difficult for the radar to distinguish between the two signals, leading to false detections or missed targets. Cancellation of cross-correlation noise in radar systems is an issue that has yet to be satisfactorily addressed.

SUMMARY

The following is a brief summary of subject matter that is described in greater detail herein. This summary is not intended to be limiting as to the scope of the claims.

Described herein are various technologies relating to improving virtual receiver extraction in various MIMO-type radar systems using space-time block codes. The use of binary symbols in digital modulator radar (e.g., orthogonal frequency division modulated (OFDM) radar, pulse modulated continuous wave (PMCW) radar, etc.) provides a significant advantage for multiple input multiple output (MIMO) radars. For MIMO radars, it is advantageous to use orthogonal waveforms on the different transmit antennas when they are transmitting concurrently, particularly for fast illumination. When employing OFDM and/or PMCW radars, different sequences of binary codes can be used in the different transmit antennas to achieve orthogonality between the transmitters; then, the cross correlation for delays of interest matter because signals are received with possible delays corresponding to the range covered by the radar. Any nonzero cross correlation side lobe indicates that energy leaks from one sequence to another (equivalently from one transmit antenna to the other during receiver processing) which can result in an increase in the noise level and a decrease in the dynamic range in the range domain. According to features described herein, complementary complex sequences transmitted in a code block are described to provide space-time block code modulation and facilitate complete cancellation of the cross-correlation noise between transmitters.

In one embodiment time-code-space transmission modulation techniques are provided that enable transmit (Tx) orthogonality by code/waveform design, such that the transmit antennas are transmitting simultaneously to achieve fast illumination and high angular resolution. The orthogonality is achieved by using complementary complex sequences, such as space-time block codes (STBC), and can also include space-frequency block codes (SFBC). STBC do not use zeros in the transmitted signal code to achieve orthogonality, thus having a high-power gain in the target estimation.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 6 illustrates several examples of space-time block code transmission schemes for a 3-transmit antenna radar system, in accordance with various features described herein.

FIG. 7 illustrates several examples of space-time block code transmission schemes for a 4-transmit antenna radar system, in accordance with various features described herein.

FIG. 8 illustrates a space-time block code transmission scheme for a 6-transmit antenna radar system, in accordance with various features described herein.

FIGS. 9A and 9B illustrate space-time block code transmission schemes for an 8-transmit antenna radar system, in accordance with various features described herein.

DETAILED DESCRIPTION

Figure 1:
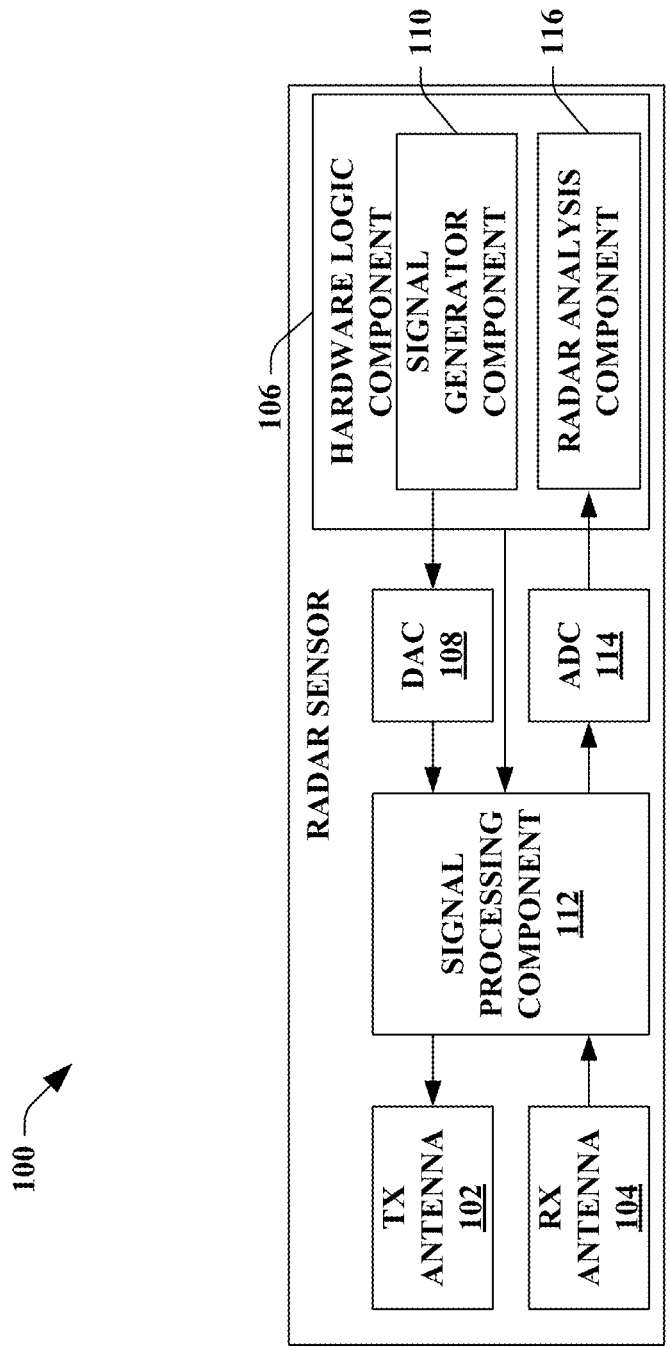
FIG. 1 is a functional block diagram of an exemplary radar sensor.

Various technologies pertaining to using space-time block codes with multiple input multiple output (MIMO) modulation in digital modulator radar are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

In orthogonal frequency division modulated (OFDM) and phase modulated continuous wave (PMCW) radar, a significant advantage is provided using orthogonal codes, which enables transmitter orthogonality by code/waveform design, and therefore the binary code families developed in other contexts such as communication can be used. However, if different sequences of the same family are used in different transmit antennas, then the cross-correlation for delays of interest matter because signals are received with possible delays corresponding to the range covered by the radar: any non-zero cross-correlation sidelobe indicates that energy leaks from one sequence to another. Table I lists the various code families and their best maximum cross-correlation sidelobes.

TABLE I

CROSS-CORRELATION PROPERTIES OF VARIOUS BINARY SEQUENCES.

| Code family | Best max cross-correlation | Remarks |
| --- | --- | --- |
| Gold or m-sequece preferred pair | $-1, \pm t(m)$ | 3-valued, $t(m) = 1 + 2^{\lfloor(m+2)/2\rfloor}$ |
| Kasami small set | $-1, \pm s(m),$ | 3-valued, $s(m) = 1 + 2^{m/2}$, m even |
| Kasami large set | $-1, -1 \pm \left(2^{\frac{m}{2}}\right),$ $-1 \pm \left(2^{\frac{m}{2}+1}\right)$ | 5-valued, , m even |
| Legendre | N/A | only one sequence per length m |
| Almost perfect sequence | approximately between $\sqrt{L_C/2}$ and $\sqrt{L_C}$ | exact analytical value unknown |
| Hadamard | 0 | periodic auto-correlaltion is very poor |

As can be seen from Table I, the listed sequence families do not exhibit exact zero cross-correlation sidelobes. In fact, the best maximum cross-correlation sidelobe can be quite high for some sequence families. Therefore, solely relying on the cross-correlation sidelobes of the sequences will not yield exactly zero cross-correlation values.

Outer code with Hadamard matrix provides another way to obtain transmission orthogonality. However, this technique requires the same code to be transmitted by antennas, at times used in the block, which makes the diversity of transmitted code impossible. Code diversity is an important property of digital modulator radars that makes it possible to reduce the effects of issues created by non-linearities, Doppler shifts, etc. The transmission techniques described herein provide full code diversity.

To overcome these problems and others, the described aspects provide multiple techniques for using space-time block codes to improve virtual receiver extraction in various types of radar systems.

With reference now to FIG. 1, an exemplary radar sensor (also referred to as a radar system) 100 is illustrated, in which various features, circuits, etc. described herein can be employed. The radar sensor 100 includes a transmit antenna 102, a receive antenna 104, and a hardware logic component 106. Briefly, the hardware logic component 106 is configured to prepare radar signals that are transmitted by the transmit antenna 102, and to compute target solutions indicating estimated positions and/or velocities of objects based upon radar returns received by the receive antenna 104. In exemplary embodiments, various components of the radar sensor 100 can be integrated as a same system-on-a-chip (SoC). In various embodiments, the radar sensor 100 can be employed on a vehicle, such as a land vehicle, an aircraft, to identify positions and velocities of objects in the operational environment of the vehicle.

The radar sensor 100 further comprises one or more digital to analog converters (DACs) 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC 108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a phase modulated continuous wave (PMCW) radar sensor.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. As will be described in greater detail below, the technologies described here and facilitate providing multiple input multiple output (MIMO) antenna operation and radar systems using space time block codes (STBC). Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises one or more analog to digital converters (ADCs) 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar analysis component 116. The radar analysis component 116 is configured to compute positions and/or velocities of targets in the operational environment of the radar sensor 100 based upon the radar data. In a non-limiting example, the radar analysis component 116 can compute a range, a bearing, and/or a velocity of a target in the operational environment of the sensor 100 based upon the radar data.

With reference now to FIGS. 2-13, there are two classes of orthogonal space-time block codes that can be used. One class comprises space-time block codes from real orthogonal designs for real signal constellations such as pulse amplitude modulation (PAM). This class employs systematic constructions with an optimal symbol transmission rate for any number of transmit antennas, which are based on the Hurwitz-Radon constructive theory. The other class comprises space-time block codes from complex orthogonal designs for complex constellations, for high data rates such as phase shift keying (PSK), binary PSK (BPSK), Gaussian minimum shift keying (GMSK), etc.

Figure 2:
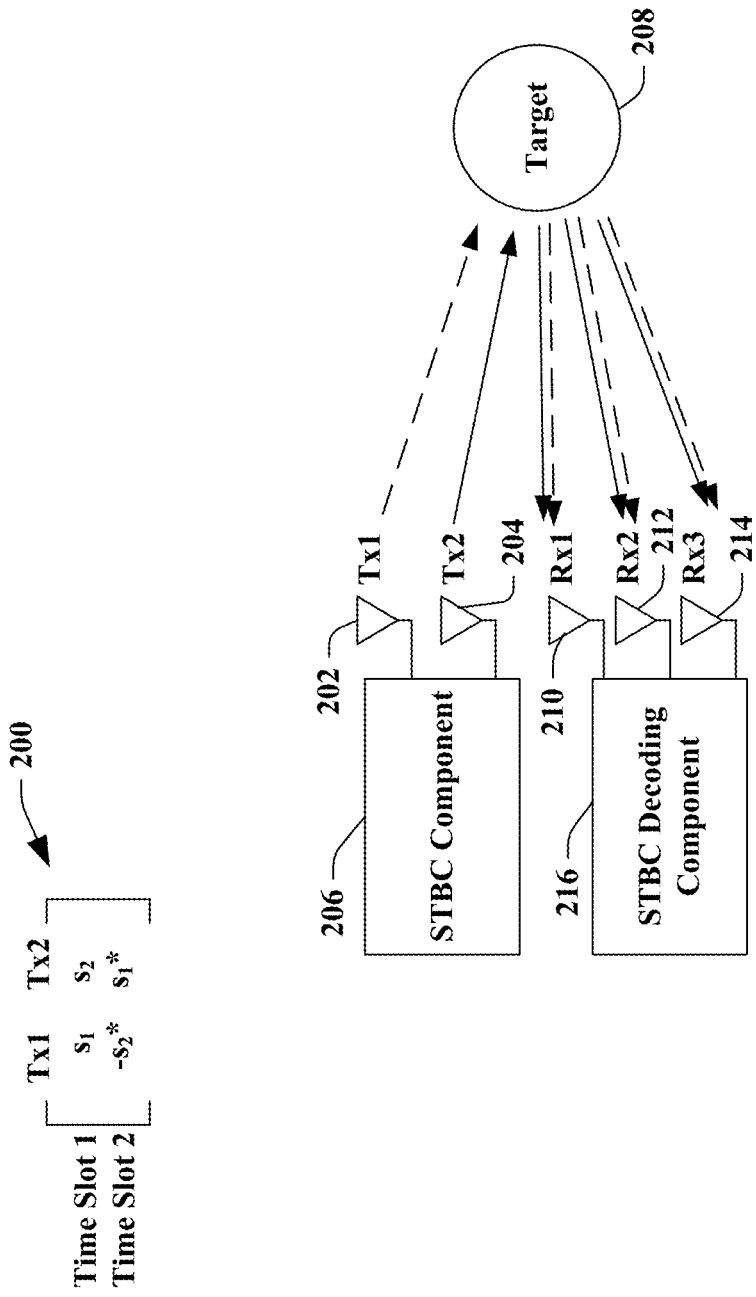
FIG. 2 shows a transmission scheme wherein space-time block codes are used.

FIG. 2 shows a transmission scheme 200 wherein Alamouti-type space-time block codes are used, which provide an orthogonal scheme for transmission using multiple antennas and multiple time slots to provide transmitter signal diversity. The transmission scheme is employed by a first transmit antenna 202 and a second transmit antenna 204 coupled to a space-time block code coding component 206. Signal transmitted by the first and second transmit antennas 202, 204 is reflected by a target 208, and the reflected signal is received by first, second, and third receive antennas 210, 212, 214, which are coupled to space-time block code decoding component 216. The transmission scheme 200 shows that the first transmit antenna 202 transmits the symbol s1 in the first time slot, and the second transmitter 204 transmits the symbol s2 concurrently in the first time slot. In the second time slot, the first transmit antenna 202 transmits the symbol −s2*, while the second transmit antenna 204 concurrently transmits the symbol s1*. In this manner, orthogonality is achieved in the spatio-temporal structure of the transmitted symbols, and the transmission has full code diversity since a different code is transmitted by a given transmit antenna in a given time slot. It will be understood that the described features are not limited to a system that uses two transmit antennas and three receive antennas, but rather can employ any number of antennas configured to transmit different symbols concurrently in a given time slot.

Figure 3A:
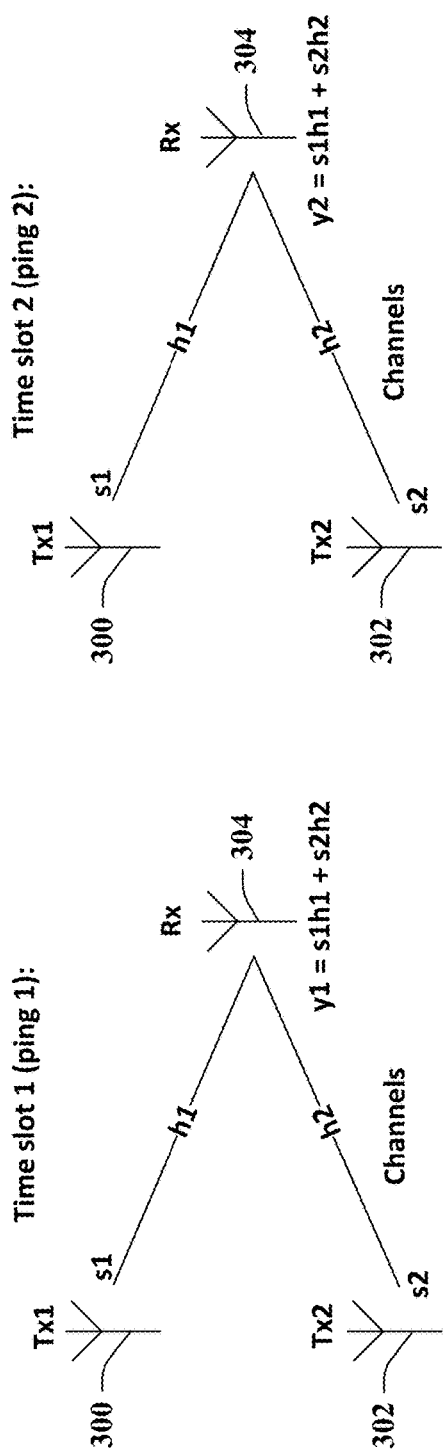
FIGS. 3A and 3B show examples for estimation of range/correlation using a system comprising two transmit antennas and one receiver antenna.
Figure 3B:
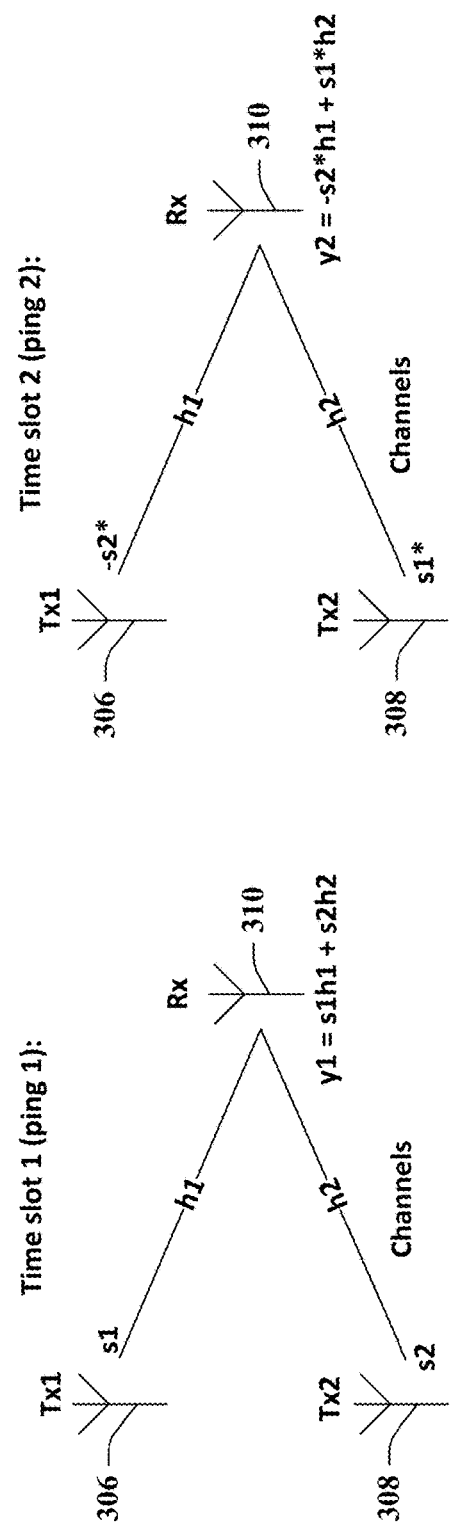

Turning now to FIGS. 3A and 3B, examples are shown for estimation of range/correlation using a system comprising two transmit antennas and one receiver antenna. In FIG. 3A a standard radar example is shown, while in FIG. 3B an example using space-time block codes is shown for comparison. In FIG. 3A, during a first time slot, a first transmit antenna 300 transmits a first symbol s1 over a first channel h1 concurrently with a second transmit antenna 302, which transmits a second symbol s2 over a second channel h2. Symbols s1 and s2 are received by the receive antenna 304 as signal Y1=s1h1+s2h2. During a second time slot, the first transmit antenna 300 again transmits symbol s1 over channel h1 to receive antenna 304 concurrently with the second transmit antenna 302 transmitting the symbol s2 over channel h2 to receive antenna 304. The transmissions are received at the receive antenna 304 as signal Y2=s1h1+s2h2, which is the same as the signal Y1 received in the first time slot.

In contrast, using space-time block codes, the example of FIG. 3B shows that signals Y1 and Y2 are different. In FIG. 3B, during a first time slot, a first transmit antenna 306 transmits a first symbol s1 over a first channel h1 concurrently with a second transmit antenna 308, which transmits a second symbol s2 over a second channel h2. Symbols s1 and s2 are received by the receive antenna 310 as signal Y1=s1h1+s2h2. However, in contrast to the example of FIG. 3A, the first transmit antenna 306 and the second transmit antenna 308 transmit different signals during the second time slot. For instance, the first transmit antenna 306 transmits the symbol −s2* over the channel h1, which represents the inverse conjugate of the symbol s2 transmitted by the second transmit antenna 308 during the first time slot. The second transmit antenna 308 transmits the signal s1* over the channel h2, which represents the conjugate of the symbol S1 transmitted by the first transmit antenna 306 during the first time slot. These conjugate symbols are received by the receiver as signal Y2=−s2*h1+s1*h2.

Referring back to FIG. 3A, when performing range/correlation estimation, the correlations of time slot 1 and time slot 2 are made. The range estimation for the signal received during the first time slot can be expressed as (where asterisks (*) denote a conjugate symbol):

$$\text{range\_Vrx1} = s1*(y1) + s1*(y2) =$$
$$s1*s1h1 + s1*s2h2 + s1*s1h1 + s1*s2h2 = 2h1 + 2h2(s1*s2),$$

where the quantity 2h2(s1*s2) represents noise in the signal.

Similarly, in the example of FIG. 3A, the range estimation for the signal received during the second time slot can be expressed as:

$$\text{range\_Vrx2} = s2*(y1) + s2*(y2) =$$
$$s2*s1h1 + s2*s2h2 + s2*s1h1 + s2*s2h2 = 2h2 + 2h1(s2*s1)$$

where the quantity 2h1(s2*s1) represents noise in the signal.

In FIG. 3B, the noise component is cancelled due to using the space-time code blocks. The range estimation for the signal received during the first time slot in the example of FIG. 3B can be expressed as:

$$\text{range\_Vrx1} =$$
$$s1*(y1) - s2(y2) = s1*s1h1 + s1*s2h2 + s2s2*h1 - s2s1*h2 = 2h1.$$

As can be seen, the noise component of FIG. 3A is not present.

Similarly, the range estimation for the signal received during the second time slot of FIG. 3B can be expressed as:

$$\text{range\_Vrx2} =$$
$$s2*(y1) + s1(y2) = s2*s1h1 + s2*s2h2 - s1s2*h1 + s1s1*h2 = 2h2.$$

Again, using the approach of FIG. 3B, the noise component of the estimation is canceled out.

Figure 4:
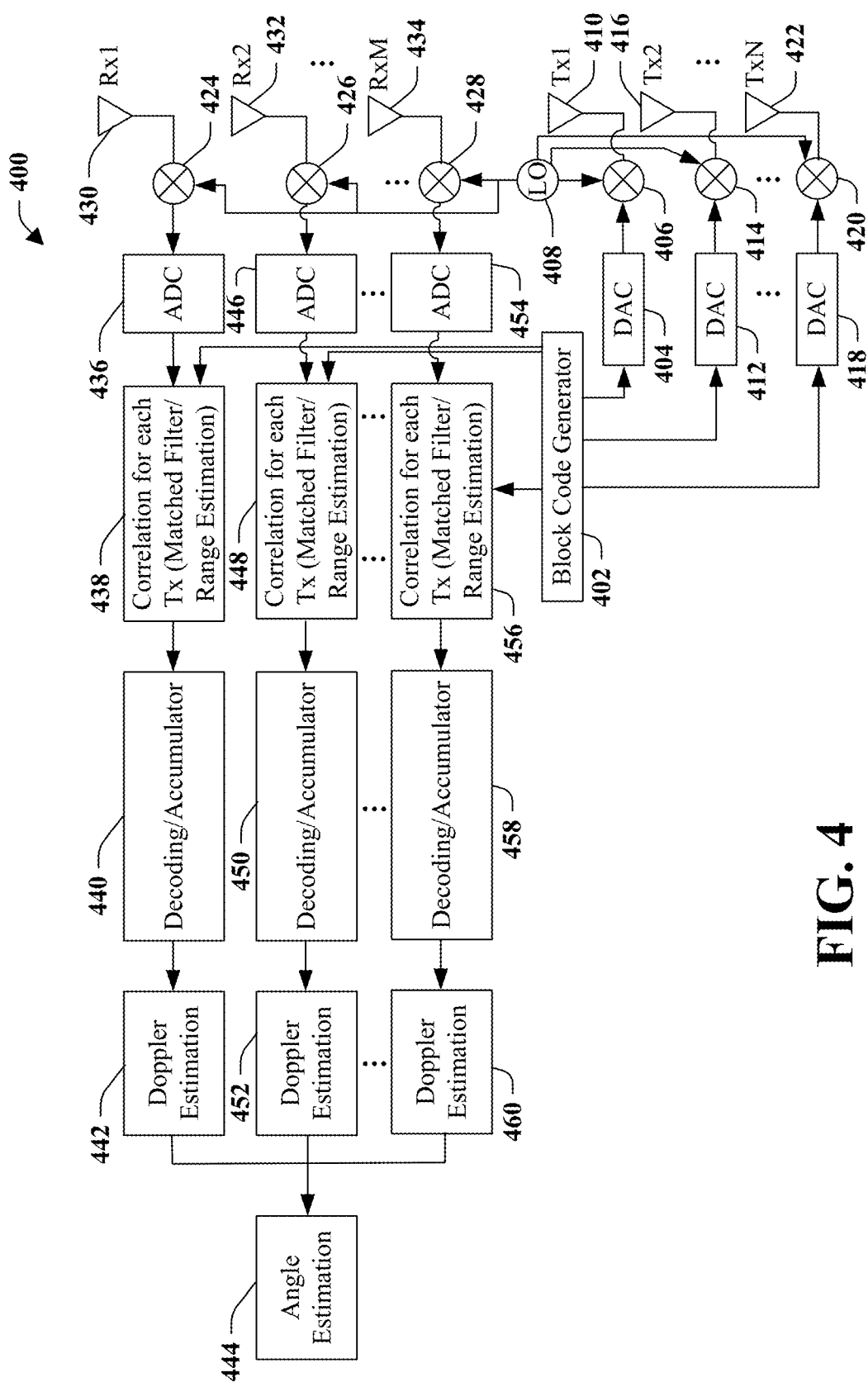
FIG. 4 shows an orthogonal frequency division multiplexing (OFDM), multiple input multiple output (MIMO) radar system 400 that uses space-time block codes for transmission.

Turning now to FIG. 4, an orthogonal frequency division multiplexing (OFDM), multiple input multiple output (MIMO) radar system 400 that uses space-time block codes for transmission is illustrated. The system comprises M receive antennas and N transmit antennas (where M and N are integers). A block code generator 402 generates space-time block codes and provides them to respective transmitter chains for transmission and to receive chains for correlation of received signals. For instance, the block code generator 402 provides space-time block codes to a digital to analog converter (DAC) 404 which converts digital codes into analog signal. A combiner component 406 combines the analog signal from the DAC 404 with a carrier wave provided by a local oscillator 408. The combined signal is transmitted by transmit antenna 410. The block code generator 402 similarly provides space-time block codes to the DAC 412 in the second transmitter chain and a DAC 418 in the Nth transmitter chain. Respective combiner components 418 and 420 combine analog signals from the respective DACs 412, 418 with carrier waves provided by the local oscillator 408, and the modulated signals are respectively transmitted from transmit antennas 416, 422.

On the receiver side, the local oscillator 408 provides carrier signal two respective combiner components 424 426, 428 in the first through the Mth receiver chains. Each combiner component 424, 426, 428 combines the carrier wave from the local oscillator 408 with a signal received via its respective receive antenna 430, 432, 434. In the first receiver chain, the modulated signal from the combiner component 424 is provided to an analog to digital converter (ADC) 436 which provides a digital signal to a correlation component 438 which in turn comprises a matched filter and performs correlation for range estimation using space-time block codes provided by the block code generator 402. Correlation information is provided to a decoding/accumulator component 440 that generates a sum of time slots of a given space-time block code during a predetermined time period. Decoded signal information is provided to a Doppler estimation component 442 that performs Doppler estimation and provides output to an angle estimation component 444.

The second through Mth receiver chains similarly comprise respective ADCs 446, 454, correlation components 448, 456, decoding/accumulator components 450, 458, and Doppler estimation components 452, 460. These receiver chains operate in the manner described above with regard to the first receiver chain (i.e., the receiver chain coupled to the first receive antenna 430) and output Doppler estimation information to the angle estimation component 444.

Figure 5:
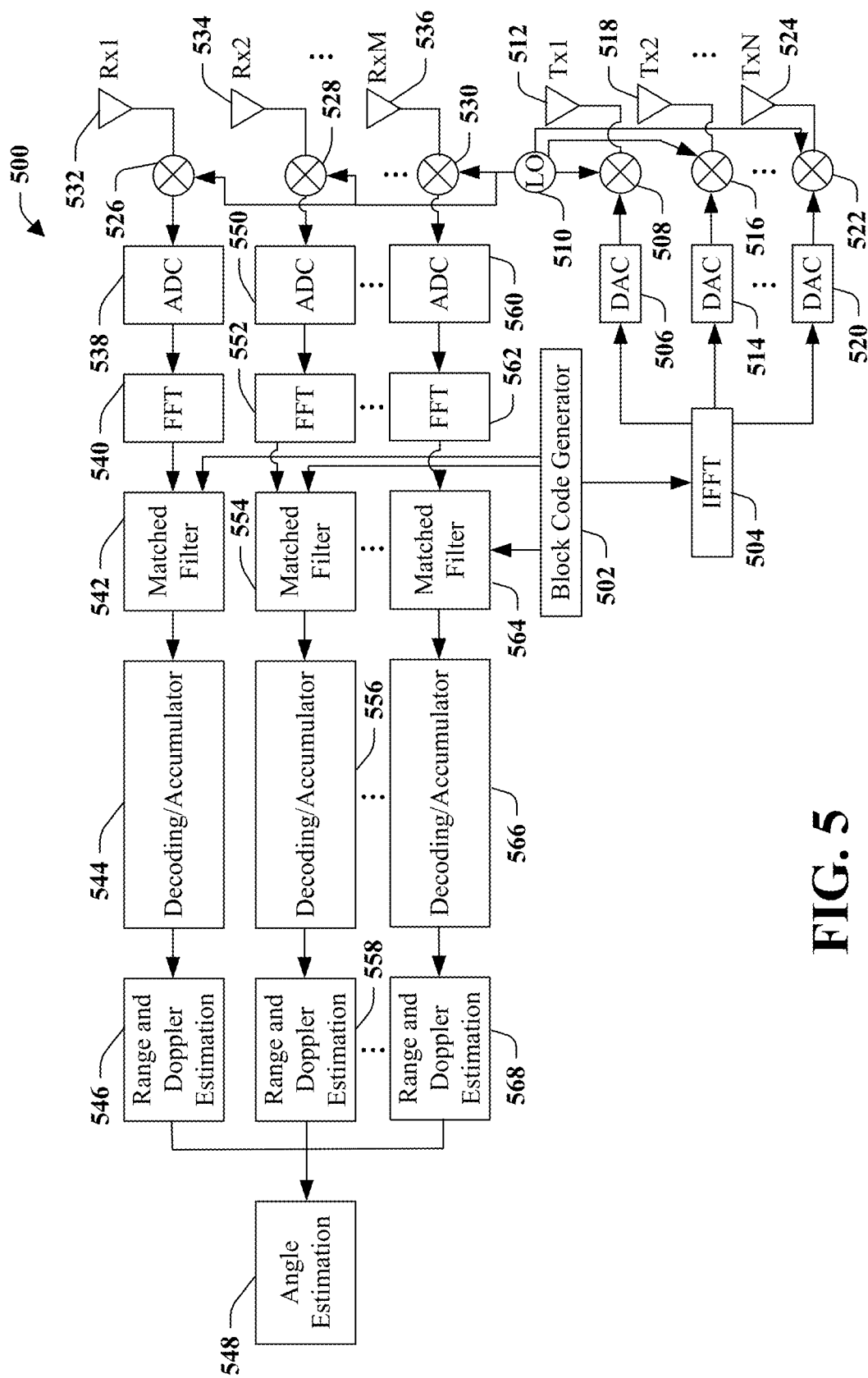
FIG. 5 illustrates a phase modulated continuous wave (PMCW), multiple input multiple output (MIMO) radar system 500 that uses space-time block codes for transmission.

FIG. 5 illustrates a phase modulated continuous wave (PMCW), multiple input multiple output (MIMO) radar system 500 that uses space-time block codes for transmission. The system comprises M receive antennas and N transmit antennas (where M and N are integers). A block code generator 502 generates space-time block codes and provides them to respective transmitter chains for transmission and to receive chains for correlation of received signals. For instance, the block code generator 502 provides space-time block codes to an inverse fast Fourier transform (IFFT) component 504 that performs an inverse fast Fourier transform on the generated space-time block code and provides its output to a digital to analog converter (DAC) 506 that converts digital codes into analog signal. A combiner component 508 combines the analog signal from the DAC 506 with the carrier wave provided by a local oscillator 510. The combined signal is then transmitted by the transmit antenna 512. The IFFT component 504 similarly provides space-time block codes to a DAC 514 in the second transmitter chain and a DAC 520 in the Nth transmitter chain. Respective combiner components 516 and 522 combine analog signals from the respective DACs 514, 520 with carrier waves provided by the local oscillator 510, and the modulated signals are respectively transmitted from transmit antennas 518, 524.

On the receiver side, the local oscillator 510 provides carrier signal to respective combiner components 526, 528, 530 in the first through the Mth receiver chains. Each combiner component 526, 528, 530 combines the carrier wave from the local oscillator 510 with a signal received via its respective transmit antenna 532, 534, 536. In the first receiver chain, the modulated signal from the combiner component 526 is provided to fast Fourier transform (FFT) component 538, which performs a fast Fourier transform on the digital signal and provides its output to a matched filter component 542. The matched filter component 542 also receives space-time block codes from the block code generator 502 and outputs a filtered signal to a decoding/accumulator component 544 that generates a sum of time slots in which a given space-time block code is transmitted. Decoded signal information is provided to a range and Doppler estimation component 546 that performs Doppler estimation and provides output to an angle estimation component 548.

The second through Mth receiver chains similarly comprise respective ADCs 550, 560, fast Fourier transform components 552, 562, matched filter components 554, 564, decoding/accumulator components 556, 566, and range and Doppler estimation components 558, 568. These receiver chains operate in the manner described above with regard to the first receiver chain (i.e., the receiver chain coupled to the first receive antenna 532) and output Doppler estimation information to the angle estimation component 548.

With regard to generalized complex orthogonal aspects of the features described herein: Considering N antennas transmitting in P time slots, the received signal Y in a given time slot p is the sum of the sequences sent by the transmitting antennas in this time slot p such that:

$$Y(p) = S(1, p) + S(2, p) + \ldots + S(N, p). \text{ where } p = 1 \ldots P$$

The sequences transmitted in a code block are complementary in such a way that:

$$Tx\_n1 = \text{Sum}(\text{conj}(S(n,p))^* Y(p)) = P(\text{Sum of } p \text{ during a predetermined time period})$$

For n=n1; and $$Tx\_n1 = \text{Sum}(\text{conj}(S(n,p))^* Y(p)) = 0(\text{Sum of } p \text{ during a predetermined time period})$$

For n=!n1;
Where n1=1 . . . N.

Therefore, the minimum number of time slots needed to transmit a completely orthogonal block is equal to the highest power of two closest to the number of transmitting antennas. For example, 1 to 2 antennas need 2 ($2^1$) time slots, 3 to 4 antennas need 4 ($2^2$) time slots, 5 to 8 antennas need 8 ($2^3$) time slots, 9 to 16 antennas need 16 (24) time slots, and so on.

For instance, let $G_c$ be a p×n matrix whose entries are:

$$0, \pm x_1, \pm x_1^*, \pm x_2 \pm x_2^*, \ldots, \pm x_k, \pm x_k^*$$

or their product with i. If $G_c G^*_c = D_c$, where $D_c$ is a diagonal matrix with the (i,i)th diagonal element of the form:

$$(l_1^*|x_1|^2 + l_2^*|x_2|^2 + \ldots l_k^*|x_k|^2)$$

and the coefficients $1^*_1, 1^*_2, \ldots 1^*_k$, all positive numbers, then is referred to as a generalized orthogonal design of size n and rate R=k/p.

Furthermore, a linear processing orthogonal design $E_c$ in variables $$0, \pm x_1, \pm x_1^*, \pm x_2 \pm x_2^*, \ldots, \pm x_k, \pm x_k^*$$

Exists if and only if there exists a complex generalized linear processing orthogonal design $G_c$ in the same variables and of the same size such that:

$$G_c G_c^* = (|x_1|^2 + |x_2|^2 + \ldots |x_k|^2)I$$

In view of the above, it can be assumed that any p×n generalized orthogonal design $G_c$ in variables $$0, \pm x_1, \pm x_1^*, \pm x_2 \pm x_2^*, \ldots, \pm x_k, \pm x_k^*$$

satisfies the equality $$G_c G_c^* = (|x_1|^2 + |x_2|^2 + \ldots |x_k|^2)I$$

after the appropriate normalization.

Turning now to FIG. 6, illustrated are several examples of space-time block code transmission schemes for a 3-transmit antenna radar system, in accordance with various features described herein. Transmission scheme 600 shows three columns of symbols for transmission by respective transmitters Tx1, Tx2, Tx3 during time slots TS1 through TS8. Transmission schemes 602, 604 each show 3 columns of symbols that may be transmitted by respective transmitters Tx1, Tx2, Tx3 during timeslots TS1 through TS4. The variations of the normal symbols, inverted symbols, conjugates symbols, and inverted conjugate symbols increase orthogonality and improve virtual receiver extraction.

Turning now to FIG. 7, illustrated are several examples of space-time block code transmission schemes for a 4-transmit antenna radar system, in accordance with various features described herein. Transmission scheme 700 shows three columns of symbols for transmission by respective transmitters Tx1, Tx2, Tx3, Tx4 during time slots TS1 through TS8. Transmission schemes 702, 704 each show 4 columns of symbols that may be transmitted by respective transmitters Tx1, Tx2, Tx3, Tx4 during timeslots TS1 through TS4. The variations of the normal symbols, inverted symbols, conjugates symbols, and inverted conjugate symbols increase orthogonality and improve virtual receiver extraction.

Turning now to FIG. 8, a space-time block code transmission scheme for a 6-transmit antenna radar system is shown, in accordance with various features described herein. Transmission scheme 800 shows six columns of symbols for transmission by respective transmitters Tx1, Tx2, Tx3 Tx4, Tx5, Tx6 during time slots TS1 through TS8. The variations of the normal symbols, inverted symbols, conjugates symbols, and inverted conjugate symbols increase orthogonality and improve virtual receiver extraction.

Turning now to FIGS. 9A and 9B, space-time block code transmission schemes for an 8-transmit antenna radar system are shown, in accordance with various features described herein. Transmission schemes 900, 902 show eight columns of symbols for transmission by respective transmitters Tx1, Tx2, Tx3 Tx4, Tx5, Tx6Tx7, Tx8 during time slots TS1 through TS8. The variations of the normal symbols, inverted symbols, conjugates symbols, and inverted conjugate symbols increase orthogonality and improve virtual receiver extraction. Transmission scheme 902 of FIG. 9B shows that complete orthogonality can be achieved using beamforming.

Figure 10A:
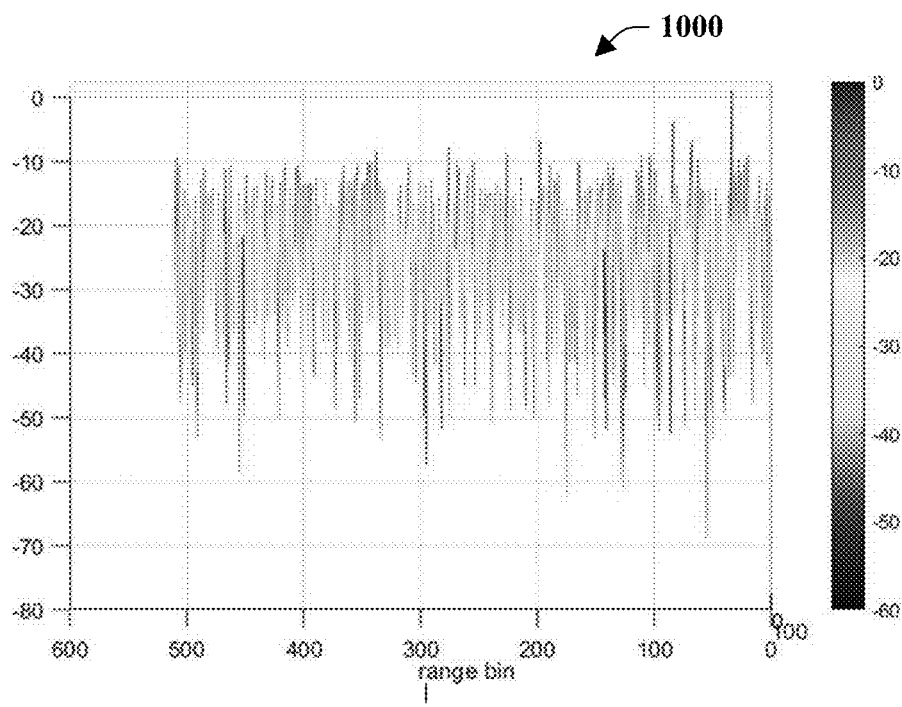
FIGS. 10A and 10B illustrate range estimation graphs depicting, respectively, standard radar and space-time block coding MIMO radar systems.
Figure 10B:
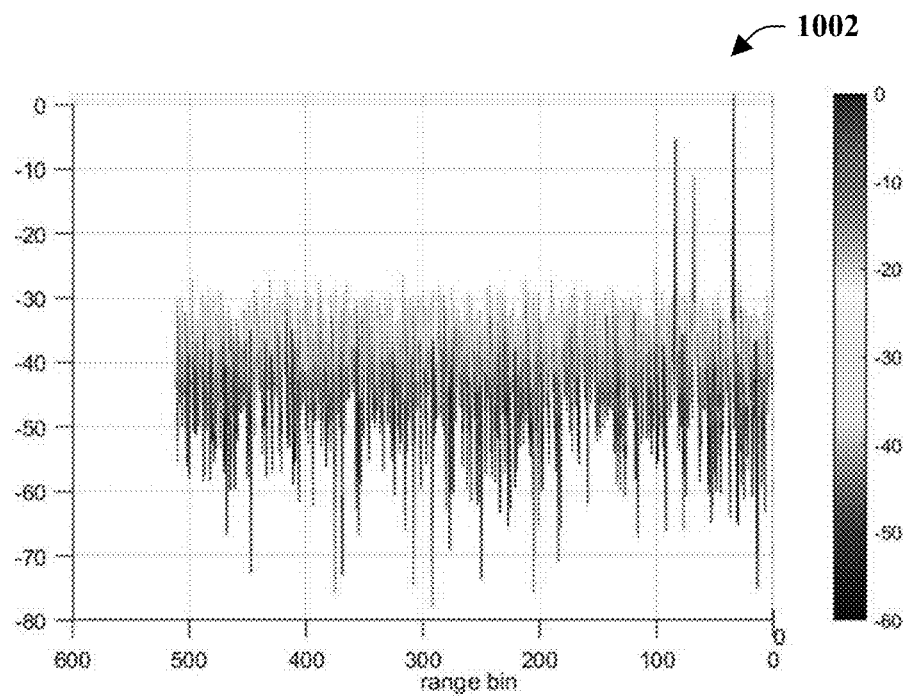

Turning now to FIGS. 10A and 10B, range estimation graphs 1000 and 1002 are shown depicting, respectively, standard radar systems and the herein described space-time block coding MIMO radar systems. The graph 1000 of FIG. 10A shows range estimation for a system that does not employ space-time block coding. The graph 1002 of FIG. 10B shows range estimation for a system that does employ space-time block coding.

Figure 11:
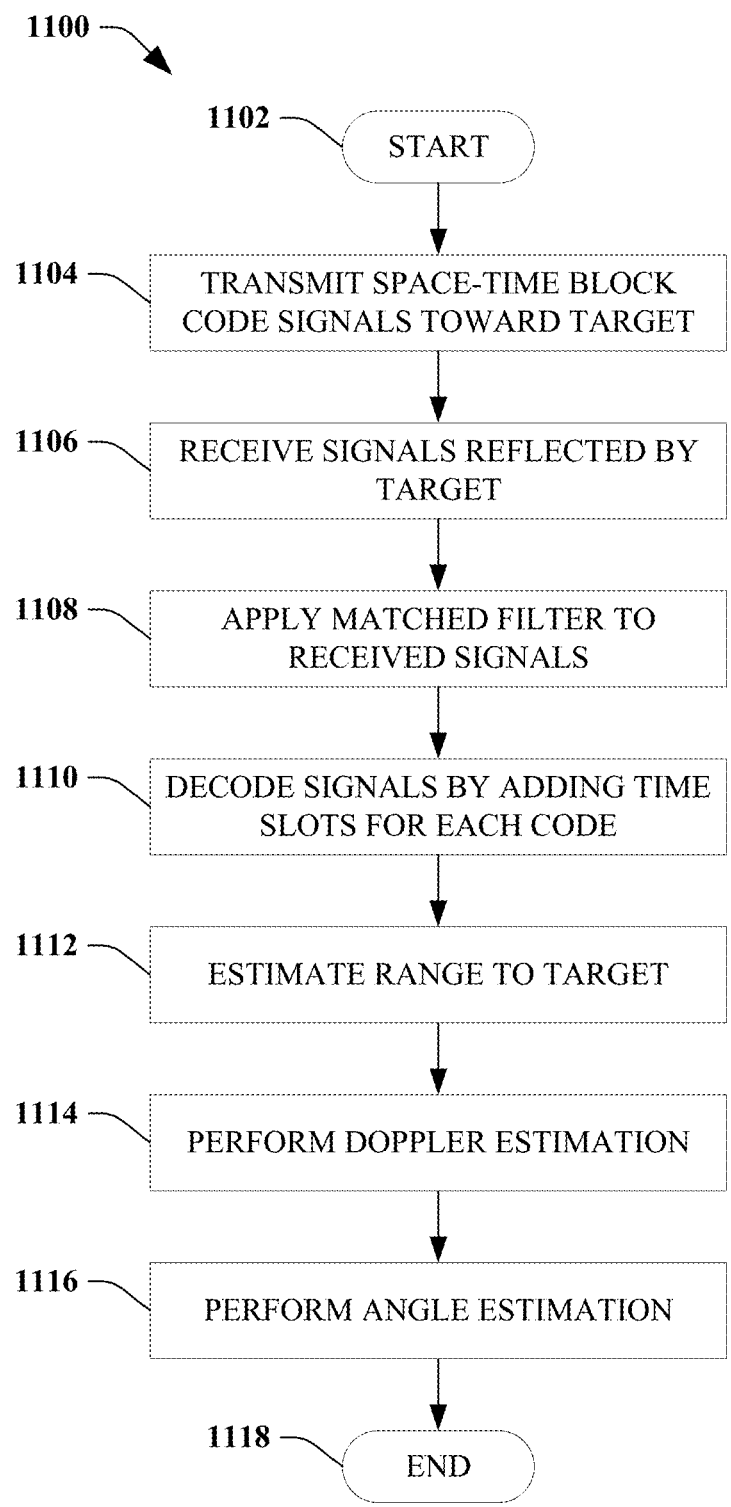
FIG. 11 illustrates a methodology that facilitates using space-time block codes in a MIMO PMCW radar system.
Figure 12:
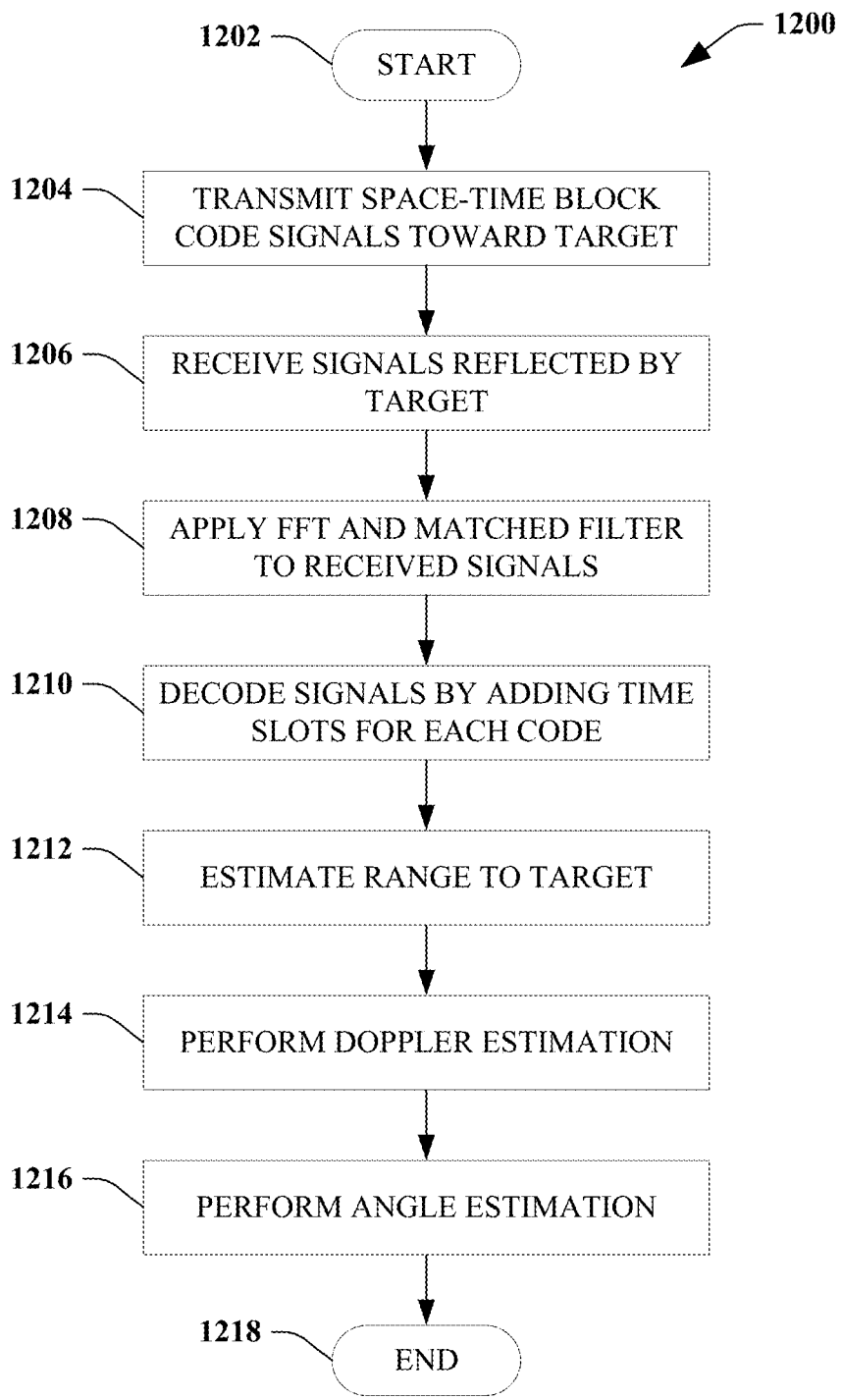
FIG. 12 illustrates a methodology that facilitates improving virtual receiver extraction using space-time block codes in a MIMO OFDM radar system.

FIGS. 11 and 12 illustrate exemplary methodologies relating to improving virtual receiver extraction using space-time block codes in various MIMO radar systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 11, a methodology 1100 is illustrated that facilitates improving virtual receiver extraction using space-time block codes in a MIMO PMCW radar system. The methodology 1100 begins at 1102 and at 1104, radar signals are transmitted toward a target from a plurality of transmit antennas, wherein respective transmit antennas employ different space-time block codes in a given transmission time slot. At 1106, transmitted signals reflected by the target are received at a plurality of receive antennas. At 1108, a matched filter is applied to received reflected signals to generate filtered signals. At 1110, filtered signals are decoded to generate decoded signals. At 1112, a range to target is estimated. The matched filter (also called a "correlator" herein) output represents the degree of similarity between the (Tx,Rx) signal pair at a given delay (or range, since the range can be estimated from the propagation delay). Combining the matched filtered signals provides signal-to-noise ratio (SNR) boosts, as well as a mechanism to suppress undesired (Tx,Rx) pairings in a given (Tx,Rx) pair.

At 1114, Doppler estimation is performed on the decoded signals to generate a plurality of Doppler estimations. At 1116, an angle estimation is performed using the plurality of Doppler estimations. At 1118, the method terminates.

In one embodiment, decoding the filtered signals comprises accumulating a signal for each space-time block code. Accumulating the signal for respective space-time block codes can comprise aggregating a sum of time slots in which a given space-time block code is received during a predetermined period of time. In another embodiment, no two transmit antennas employ the same space-time block code in a given time slot. In yet another embodiment, the radar system is configured for phase-modulated continuous wave (PMCW) operation. Moreover, the radar system can be deployed in an autonomous vehicle.

Referring now to FIG. 12, a methodology 1200 is illustrated that facilitates improving virtual receiver extraction using space-time block codes in a MIMO OFDM radar system. The methodology 1200 begins at 1202 and at 1204, radar signals are transmitted toward a target from each of a plurality of transmit antennas, wherein respective transmit antennas employ different space-time block codes in a given transmission time slot. At 1206, transmitted signals reflected by the target are received at a plurality of receive antennas. At 1208, fast Fourier transform and a matched filter are applied to received reflected signals to generate filtered signals. At 1210, the filtered signals are decoded to generate decoded signals. At 1212, a range to target is estimated. The matched filter (also called a "correlator" herein) output represents the degree of similarity between the (Tx,Rx) signal pair at a given delay (or range, since the range can be estimated from the propagation delay). Combining the matched filtered signals provides signal-to-noise ratio (SNR) boosts, as well as a mechanism to suppress undesired (Tx,Rx) pairings in a given (Tx,Rx) pair.

At 1214, Doppler estimation is performed on the decoded signals to generate a plurality of Doppler estimations. At 1216, an angle estimation is performed using the plurality of Doppler estimations. At 1218, the method terminates.

In one embodiment, decoding the filtered signals comprises accumulating a signal for each space-time block code. Accumulating the signal for each space-time block code can comprise aggregating a sum of time slots in which respective space-time block codes are received during a predetermined period of time. In another embodiment, no two transmit antennas employ the same space-time block code in a given time slot. Moreover, the radar system can be deployed in an autonomous vehicle.

Figure 13:
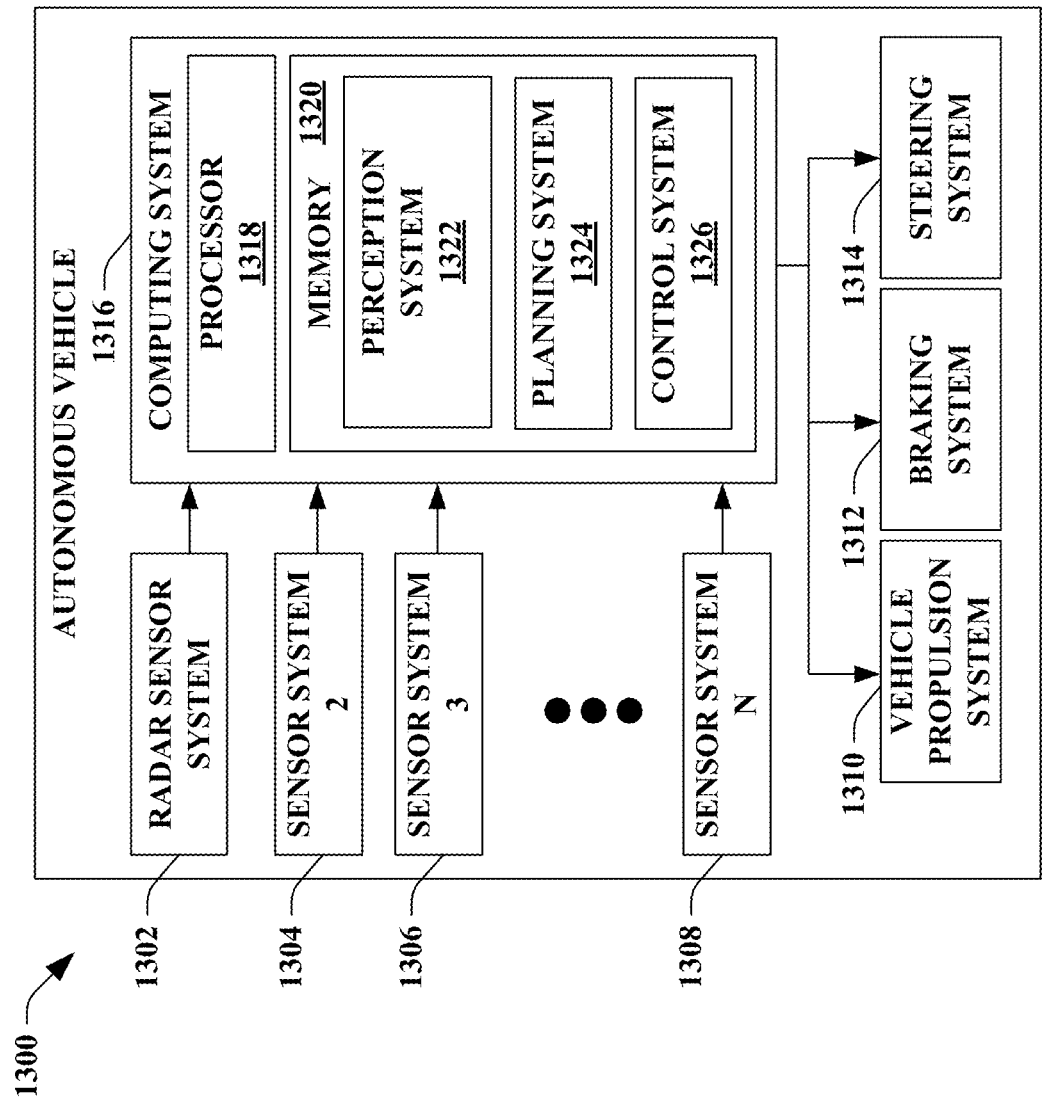
FIG. 13 is a functional block diagram of an exemplary AV.

Various technologies described herein are suitable for use in connection with an autonomous vehicle (AV) that employs a radar system to facilitate navigation about roadways. Referring now to FIG. 13, an exemplary AV 1300 is illustrated, wherein the AV 1300 can navigate about roadways without human conduction based upon sensor signals output by sensor systems of the AV 1300. The AV 1300 includes a plurality of sensor systems 1302-1308 (a first sensor system 1302 through an Nth sensor system 1308). The sensor systems 1302-1308 may be of different types. For example, the first sensor system 1302 is a radar sensor system, the second sensor system 1304 may be a lidar sensor system, the third sensor system 1306 may be a camera (image) system, and the Nth sensor system 1308 may be a sonar system. Other exemplary sensor systems include GPS sensor systems, inertial sensor systems, infrared sensor systems, and the like. The various sensor systems 1302-1308 are arranged about the AV 1300. The sensor systems 1302-1308 are configured to repeatedly (e.g., continuously, or periodically) output sensor data that is representative of objects and conditions in the driving environment of the AV 1300.

The AV 1300 further includes several mechanical systems that are used to effectuate appropriate motion of the AV 1300. For instance, the mechanical systems can include but are not limited to, a vehicle propulsion system 1310, a braking system 1312, and a steering system 1314. The vehicle propulsion system 1310 may be an electric engine, an internal combustion engine, or a combination thereof. The braking system 1312 can include an engine brake, brake pads, actuators, a regenerative braking system, and/or any other suitable componentry that is configured to assist in decelerating the AV 1300. The steering system 1314 includes suitable componentry that is configured to control the direction of movement of the AV 1300.

The AV 1300 additionally comprises a computing system 1316 that is in communication with the sensor systems 1302-1308 and is further in communication with the vehicle propulsion system 1310, the braking system 1312, and the steering system 1314. The computing system 1316 includes a processor 1318 and memory 1320 that includes computer-executable instructions that are executed by the processor 1318. In an example, the processor 1318 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 1320 comprises a perception system 1322, a planning system 1324, and a control system 1326. Briefly, the perception system 1322 is configured to identify the presence of objects and/or characteristics of objects in the driving environment of the AV 1300 based upon sensor data output by the sensor systems 1302-1308. The planning system 1324 is configured to plan a route and/or a maneuver of the AV 1300 based upon data pertaining to objects in the driving environment that are output by the perception system 1322. The control system 1326 is configured to control the mechanical systems 1310-1314 of the AV 1300 to effectuate appropriate motion to cause the AV 1300 to execute a maneuver planned by the planning system 1324.

The perception system 1322 is configured to identify objects in proximity to the AV 1300 that are captured in sensor signals output by the sensor systems 1302-1308. By way of example, the perception system 1322 can be configured to identify the presence of an object in the driving environment of the AV 1300 based upon images generated by a camera system included in the sensor systems 1304-1308. In another example, the perception system 1322 can be configured to determine a presence and position of an object based upon radar data output by the radar sensor system 1302. In exemplary embodiments, the radar sensor system 1302 can be or include the radar sensor 100. In such embodiments, the perception system 1322 can be configured to identify a position of an object in the driving environment of the AV 1300 based upon the estimated range output by the radar sensor 100.

Figure 14:
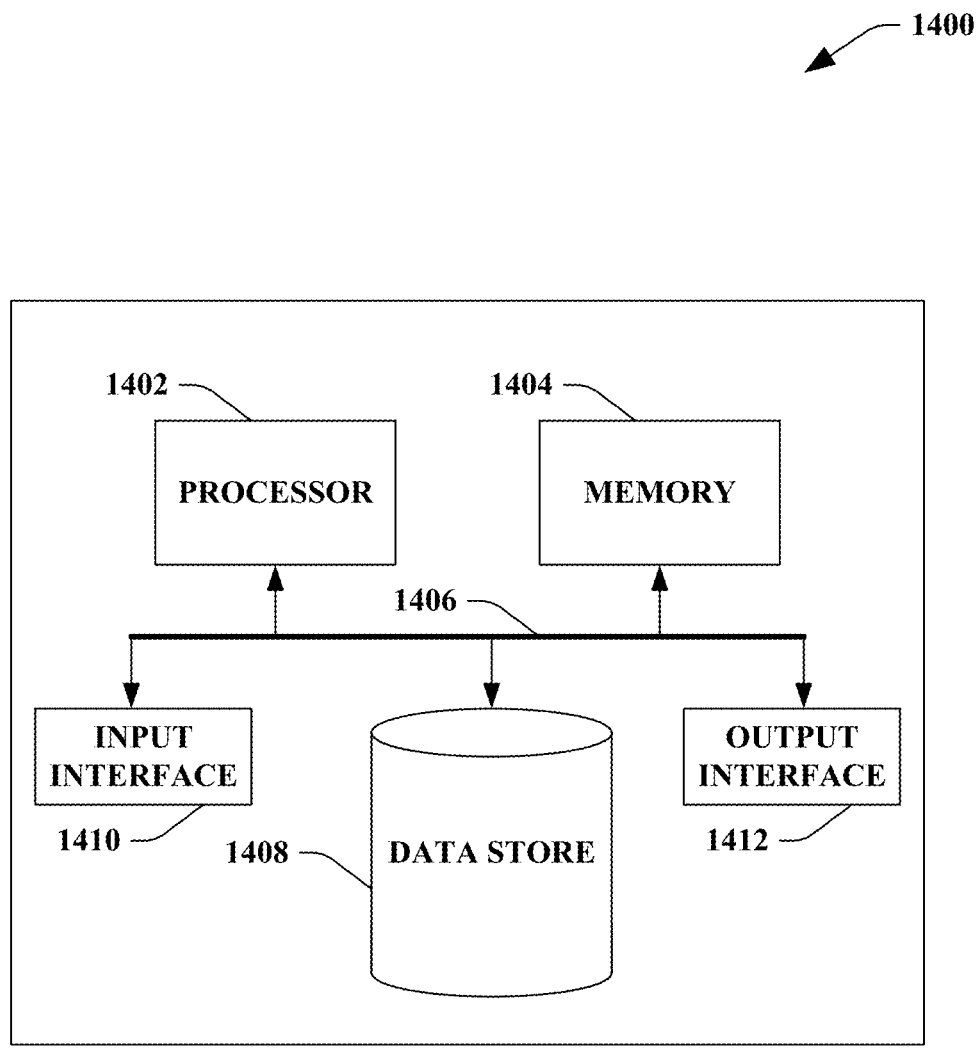
FIG. 14 is an exemplary computing system.

Referring now to FIG. 14, a high-level illustration of an exemplary computing device 1400 that can be used in accordance with the systems and methodologies disclosed herein is illustrated. For instance, the computing device 1400 may be or include the computing system 1316. The computing device 1400 includes at least one processor 1402 that executes instructions that are stored in a memory 1404. The instructions may be, for instance, instructions for implementing functionality described as being carried out by one or more modules, components, or systems discussed above or instructions for implementing one or more of the methods described above. The processor 1402 may be a GPU, a plurality of GPUs, a CPU, a plurality of CPUs, a multi-core processor, a combination of the foregoing, etc. The processor 1402 may access the memory 1404 by way of a system bus 1406. In addition to storing executable instructions, the memory 1404 may also store radar data, beamformed radar data, neural network configurations, etc.

The computing device 1400 additionally includes a data store 1408 that is accessible by the processor 1402 by way of the system bus 1406. The data store 1408 may include executable instructions, radar data, beamformed radar data, embeddings of these data in latent spaces, etc. The computing device 1400 also includes an input interface 1410 that allows external devices to communicate with the computing device 1400. For instance, the input interface 1410 may be used to receive instructions from an external computing device, etc. The computing device 1400 also includes an output interface 1412 that interfaces the computing device 1400 with one or more external devices. For example, the computing device 1400 may transmit control signals to the vehicle propulsion system 1310, the braking system 1312, and/or the steering system 1314 by way of the output interface 1412.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

Systems and methods have been described herein in accordance with at least the examples set forth below.

(A1) In one aspect, a method performed by a radar system is described. The method includes transmitting toward a target a radar signal from a plurality of transmit antennas, wherein respective transmit antennas employ different space-time block codes in a given transmission time slot. The method further includes receiving at a plurality of receive antennas a radar return that includes transmitted signals reflected by the target. The method also includes applying a matched filter to received reflected signals to generate filtered signals. The method further includes decoding the filtered signals to generate decoded signals. Moreover, the method includes estimating a range to the target. The method further includes performing Doppler estimation on the decoded signals to generate a plurality of Doppler estimations. Further, the method includes performing an angle estimation using the plurality of Doppler estimations.

(A2) In some embodiments of the method of (A1), decoding the filtered signals includes accumulating a signal for respective space-time block codes.

(A3) In some embodiments of the method of (A2), accumulating the signal for respective space-time block codes includes generating a sum of time slots in which a given space-time block code is received during a predetermined period of time.

(A4) In some embodiments of at least one of the methods of (A1)-(A3), no two transmit antennas employ the same space-time block code in a given time slot.

(A5) In some embodiments of at least one of the methods of (A1)-(A4), the radar system is deployed in an autonomous vehicle.

(A6) In some embodiments of at least one of the methods of (A1)-(A5), the radar system is configured for phase-modulated continuous wave (PMCW) operation.

(A7) In some embodiments of at least one of the methods of (A1)-(A5), the method further includes applying a fast Fourier transform prior to applying the matched filter to generate the filtered signals, wherein the radar system is configured for orthogonal frequency division multiplexing (OFDM) operation.

(B1) In another aspect, a method performed by a radar system is described herein. The method includes transmitting toward a target a radar signal from a plurality of transmit antennas, wherein respective transmit antennas employ different space-time block codes in a given transmission time slot. The method further includes receiving at a plurality of receive antennas a radar return including transmitted signals reflected by the target. The method also includes applying a fast Fourier transform and a matched filter to received reflected signals to generate filtered signals. The method further includes decoding the filtered signals to generate decoded signals. Moreover, the method includes estimating a range to the target. Further, the method includes performing Doppler estimation on the decoded signals to generate a plurality of Doppler estimations. The method also includes performing an angle estimation using the plurality of Doppler estimations.

(B2) In some embodiments of the method of (B1), decoding the filtered signals includes accumulating a signal for respective space-time block codes.

(B3) In some embodiments of the method of (B2), accumulating the signal for respective space-time block codes includes generating a sum of time slots in which a given space-time block code is received during a predetermined period of time.

(B4) In some embodiments of at least one of the methods of (B1)-(B3), no two transmit antennas employ the same space-time block code in a given time slot.

(B5) In some embodiments of at least one of the methods of (B1)-(B4), the radar system is deployed in an autonomous vehicle.

(B6) In some embodiments of at least one of the methods of (B1)-(B5), the radar system is configured for orthogonal frequency division multiplexing (OFDM) operation.

(C1) In another aspect, a radar system is described herein. The radar system includes a plurality of transmit antennas that transmit toward a target a radar signal, wherein respective transmit antennas employ different space-time block codes in a given transmission time slot. The radar system further includes a plurality of receive antennas that receive a radar return comprising transmitted signals reflected by the target. The radar system also includes a matched filter component that filters a received reflected signal to generate a filtered signal. Further, the radar system includes a decoder component that decodes the filtered signal to generate a decoded signal. Moreover, the radar system includes a Doppler estimation component that generates a Doppler estimation based on the decoded signal. The radar system also includes an angle estimation component that generates an angle estimation based on the Doppler estimation. The radar system is configured to estimate a range to the target based on the filtered signal.

(C2) In some embodiments of the radar system of (C1), the decoder component accumulates a signal for the respective space-time block codes.

(C3) In some embodiments of the radar system of (C2), for respective space-time block codes, the decoder accumulates a sum of time slots in which a given space-time block code is received during a predetermined period of time.

(C4) In some embodiments of at least one of the radar systems of (C1)-(C3), no two transmit antennas employ the same space-time block code in a given time slot.

(C5) In some embodiments of at least one of the radar systems of (C1)-(C4), the radar system is deployed in an autonomous vehicle.

(C6) In some embodiments of at least one of the radar systems of (C1)-(C5), the radar system further includes a fast Fourier transform component that operates on the received reflected signal prior to the matched filter component.

(C7) In some embodiments of the radar system of (C6), the radar system is configured for orthogonal frequency division multiplexing (OFDM) operation.

(C8) In some embodiments of at least one of the radar systems of (C1)-(C7), the radar system is configured for phase-modulated continuous wave (PMCW) operation.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system, the method comprising:
    transmitting toward a target a radar signal from a first antenna and a second antenna, wherein the first antenna transmits a first transmitted signal comprising a first space-time block code (STBC) over a first channel during a first time slot and the second antenna transmits a second transmitted signal comprising a second STBC over a second channel during the first time slot and the first antenna transmits a third transmitted signal comprising a conjugate of the second STBC over the first channel during a second time slot and the second antenna transmits a fourth transmitted signal comprising a conjugate of the first STBC over the second channel during the second time slot;
    receiving at a plurality of receive antennas a first radar return comprising the first transmitted signal and the second transmitted signal reflected by the target during the first time slot and a second radar return comprising the third transmitted signal and the fourth transmitted signal reflected by the target during the second time slot;
    applying a matched filter to the first radar return and the second radar return to estimate a filtered signal based on a first product of the first transmitted signal with the first radar return and a second product of the second transmitted signal with the second radar return;
    decoding the filtered signal to generate a decoded signal;
    estimating a range to the target based on the decoded signal;
    performing Doppler estimation on the decoded signal to generate a plurality of Doppler estimations;
    performing an angle estimation using the plurality of Doppler estimations;
    estimating a position and velocity of the target from the range and the angle estimation; and
    providing the estimated position and velocity of the target to an operational environment of a vehicle.

2. The method of claim 1, wherein decoding the filtered signals comprises accumulating a signal for respective space-time block codes.

3. The method of claim 2, wherein accumulating the signal for respective spacetime block codes comprises generating a sum of time slots in which a given space-time block code is received during a predetermined period of time.

4. The method of claim 1, wherein no two transmit antennas employ the same space-time block code in a given time slot.

5. The method of claim 1, wherein the radar system is deployed in an autonomous vehicle.

6. The method of claim 1, wherein the radar system is configured for phase-modulated continuous wave (PMCW) operation.

7. A method performed by a radar system, the method comprising:
    transmitting toward a target a radar signal from a first antenna and a second antenna, wherein the first antenna transmits a first transmitted signal comprising a first space-time block code (STBC) over a first channel during a first time slot and the second antenna transmits a second transmitted signal comprising a second STBC over a second channel during the first time slot and the first antenna transmits a third transmitted signal comprising a conjugate of the second STBC over the first channel during a second time slot and the second antenna transmits a fourth transmitted signal comprising a conjugate of the first STBC over the second channel during the second time slot;
    receiving at a plurality of receive antennas a first radar return comprising the first transmitted signal and the second transmitted signal reflected by the target during the first time slot and a second radar return comprising the third transmitted signal and the fourth transmitted signal reflected by the target during the second time slot;
    applying a fast Fourier transform and a matched filter to the first radar return and the second radar return-to estimate a filtered signal based on a first product of the first transmitted signal with the first radar return and a second product of the second transmitted signal with the second radar return;
    decoding the filtered signal to generate a decoded signal;
    estimating a range to the target based on the decoded signal;
    performing Doppler estimation on the decoded signal to generate a plurality of Doppler estimations;
    performing an angle estimation using the plurality of Doppler estimations;
    estimating a position and velocity of the target from the range and the angle estimation; and p1 providing the estimated position and velocity of the target to an operational environment of a vehicle.

8. The method of claim 7, wherein decoding the filtered signals comprises accumulating a signal for respective space-time block codes.

9. The method of claim 8, wherein accumulating the signal for respective space-time block codes comprises generating a sum of time slots in which a given space-time block code is received during a predetermined period of time.

10. The method of claim 7, wherein no two transmit antennas employ the same space-time block code in a given time slot.

11. The method of claim 7, wherein the radar system is deployed in an autonomous vehicle.

12. The method of claim 7, wherein the radar system is configured for orthogonal frequency division multiplexing (OFDM) operation.

13. A radar system comprising:
a first antenna and a second antenna, wherein the first antenna transmits a first transmitted signal comprising a first space-time block code (STBC) over a first channel during a first time slot and the second antenna transmits a second transmitted signal comprising a second STBC over a second channel during the first time slot and the first antenna transmits a third transmitted signal comprising a conjugate of the second STBC over the first channel during a second time slot and the second antenna transmits a fourth transmitted signal comprising a conjugate of the first STBC over the second channel during the second time slot
a plurality of receive antennas that receive a first radar return comprising the first transmitted signal and the second transmitted signal reflected by a target during the first time slot and a second radar return comprising the third transmitted signal and the fourth transmitted signal reflected by the target during the second time slot;
a matched filter configured to estimate a filtered signal based on a first product of the first transmitted signal with the first radar return and a second product of the second transmitted signal with the second radar return;
a decoder component that decodes the filtered signal to generate a decoded signal;
a Doppler estimation component that generates a Doppler estimation based on the decoded signal; and
an angle estimation component that generates an angle estimation based on the Doppler estimation;
wherein the radar system is configured to estimate a range to the target based on the filtered signal, estimate a position and velocity of the target from the range and the angle estimation and provide the estimated position and velocity of the target to an operational environment of a vehicle.

14. The radar system of claim 13, wherein the decoder component accumulates a signal for the respective space-time block codes.

15. The radar system of claim 14, wherein for respective space-time block codes, the decoder accumulates a sum of time slots in which a given space-time block code is received during a predetermined period of time.

16. The radar system of claim 13, wherein no two transmit antennas employ the same space-time block code in a given time slot.

17. The radar system of claim 13, wherein the radar system is deployed in an autonomous vehicle.

18. The radar system of claim 13, further comprising a fast Fourier transform component that operates on the received reflected signal prior to the matched filter.

19. The radar system of claim 18, wherein the radar system is configured for orthogonal frequency division multiplexing (OFDM) operation.

20. The radar system of claim 13, wherein the radar system is configured for phase-modulated continuous wave (PMCW) operation.

* * * * *